United States Patent
Deye

[11] 3,882,176
[45] May 6, 1975

[54] N-TRIFLUOROACETYL AMIDOXIME-O-CARBAMATES AND THEIR USE AS ANTIHYPERTENSIVE AGENTS IN WARM-BLOODED ANIMALS

[75] Inventor: Jerome Ferdinand Deye, Philadelphia, Pa.

[73] Assignee: E. I. du Pont de Nemours & Company, Wilmington, Del.

[22] Filed: Oct. 10, 1973

[21] Appl. No.: 404,918

[52] U.S. Cl.. 260/561 HL; 260/561 K; 260/566 AC
[51] Int. Cl.......................................... C07c 103/30
[58] Field of Search... 260/561 R, 561 HL, 566 AC, 260/561 K

[56] References Cited
UNITED STATES PATENTS
3,694,431  9/1972  Fuchs et al.................. 260/561 HL

*Primary Examiner*—C. Davis

[57] ABSTRACT

Antihypertensive N-trifluoroacetyl amidoxime-O-carbamates of the formula

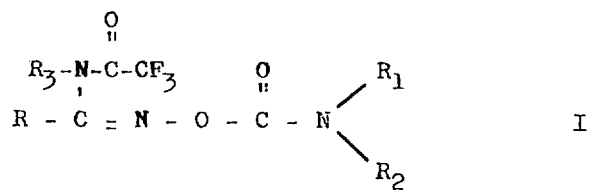

where
R is certain organic radicals, and
$R_1$, $R_2$ and $R_3$ are hydrogen or certain organic radicals.

This class of compounds exhibits antihypertensive activity in warm-blooded animals. Exemplary compounds are:
N-trifluoroacetylpentanamidoxime-O-(N-methylcarbamate)
N-methyl-N-trifluoroacetylpentanamidoxime-O-(N-methyl-carbamate)

7 Claims, No Drawings

N-TRIFLUOROACETYL AMIDOXIME-O-CARBAMATES AND THEIR USE AS ANTIHYPERTENSIVE AGENTS IN WARM-BLOODED ANIMALS

BACKGROUND OF THE INVENTION

Copending U.S. Pat. Application Ser. No. 150,901, filed June 8, 1971, now abandoned, by Rosetta M. Henderson (which is a continuation-in-part of U.S. Pat. Application Ser. No. 884,737, filed Dec. 12, 1969, now abandoned, which is in turn a continuation-in-part of U.S. Pat. Application Ser. No. 789,959, filed Jan. 8, 1969, now abandoned) discloses a class of O-carbamoyl and their use as antihypertensive agents in warm-blooded animals.

The present invention resulted from efforts to discover new compounds possessing antihypertensive activity. The amidoxime-O-carbamates of the present invention differ materially in structure from and in general exhibit a higher degree of thermal stability than the compounds disclosed in the above-mentioned U.S. application. In addition, the novel compounds of the present invention in general possess higher melting points, thus allowing one to use high speed tableting machinery in producing formulations of the present invention.

SUMMARY OF THE INVENTION

This invention is a class of novel N-trifluoroacetyl amidoxime-O-carbamates of the formula

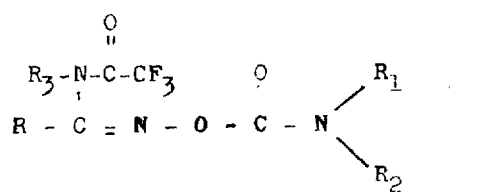

I where
R is an aliphatic hydrocarbon having 3 through 12 carbon atoms, $R_1$ and $R_2$ are each hydrogen or lower alkyl of 1 through 3 carbon atoms, provided however, that the sum of carbon atoms in $R_1$ and $R_2$ does not exceed 3, $R_3$ is hydrogen or alkyl of 1 through 6 carbon atoms and the pharmaceutically acceptable salts of these compounds. Illustrative of such salts are alkali metals salts such as sodium salts and potassium salts and alkali earth metal salts such as calcium salts.

For the term "R" in the above formula, the expression "aliphatic hydrocarbon" is intended to embrace saturated and unsaturated groups having no more than one double bond and thus is intended to include acyclic groups such as alkyl and alkenyl, cyclic groups such as cycloalkyl and cycloalkenyl, and saturated and unsaturated polycyclic groups.

The invention also includes methods for treating hypertension in warm-blooded animals which comprise administering to said animal an antihypertensive amount of compounds of this invention, and further includes pharmaceutical compositions which contain an antihypertensive amount of a compound of this invention in combination with suitable pharmaceutical adjuvants and/or modifiers.

DETAILED DESCRIPTION OF THE INVENTION

Preferred Compounds

Certain of the compounds of Formula I are preferred because of their higher pharmaceutical activity, increased stability, and/or improved characteristics enabling high speed tableting. These compounds include those wherein $R_1$, $R_2$, and $R_3$ are each independently hydrogen or methyl.

Preferred Compounds within this scope include:
N-trifluoroacetylpentanamidoxime-O-(N-methylcarbamate)
N-methyl-N-trifluoroacetylpentanamidoxime-O-(N-methylcarbamate)
N-trifluoroacetylbutanamidoxime-O-carbamate

Synthesis of the Final Products

The compounds of the present invention can be prepared by reacting an appropriate amidoxime-O-carbamate with trifluoroacetic anhydride or trifluoroacetyl chloride according to the following reaction schemes:

(A)

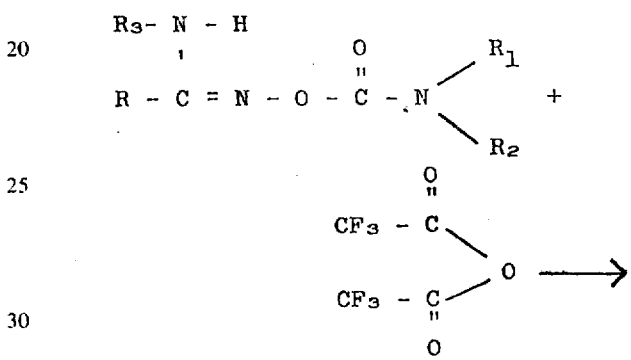

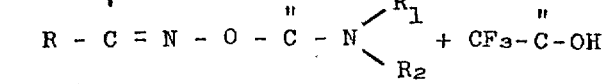

(B)

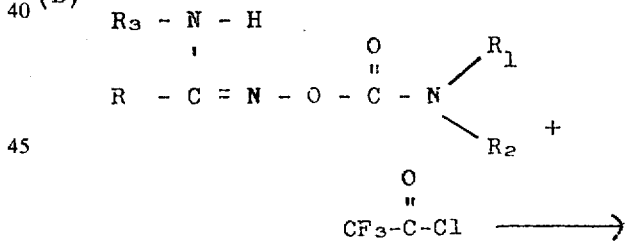

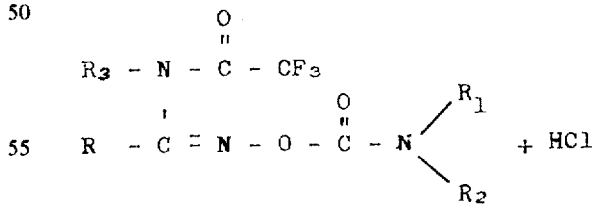

where
R is an aliphatic hydrocarbon having from 3 through 12 carbon atoms,
$R_1$ and $R_2$ are each hydrogen or lower alkyl of 1 through 3 carbon atoms, provided, however, that the sum of carbon atoms in $R_1$ and $R_2$ does not exceed 3, and
$R_3$ is hydrogen or alkyl of 1 through 6 carbon atoms.

The reactions represented by equations (A) and (B) can be performed by contacting the appropriate reactants in an inert solvent while maintaining the temperature at about 0°–30°C., preferably at about 25°C. Suitable solvents include dichloromethane, chloroform, carbontetrachloride, benzene, ether, hexane, pentane and cyclohexane. If desired, a catalyst such as 1,4-diazabicyclo[2.2.2]octane, (DABCO), or other organic bases such as pyridine, quinoline, and trialkylamines such as triethylamine, can be added to the reaction vessel either before, during or subsequent to the addition of the reactants. Following completion of the reaction of the volatile components of the reaction mixture are removed by evaporation and the residue can be washed with water, purified by recrystallization from hexane and dried.

The salts of amidoxime-O-carbamates of the invention can be prepared by treating a solution of the compound with the base of the salt desired. The solvent can be selected to provide a system in which the salt formed is insoluble and therefore easily separated from the solution. Alternatively, a solvent system in which the end product salt is soluble such as methanol, ethanol or other low boiling aliphatic alcohols can be employed and the solvent can be removed by evaporation.

In general, the salts of the amidoxime-O-carbamates of the invention hydrolyze readily and thus are less desirable for use in formulating pharmaceutical compositions of the invention than the amidoxime-O-carbamates per se.

Synthesis of the Precursor Compounds

The amidoxime-O-carbamate precursors where $R_3$ is hydrogen are the subject of copending U.S. Pat. application Ser. No. 150,901, mentioned above. These amidoxime-O-carbamate precursors can be prepared as follows.

Amidoximes are prepared readily in accordance with the general procedure of F. Tiemann, Ber. 17 126 (1884) which may be represented by equation (C) below:

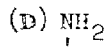
(C) $R-CN + H_2NOH \longrightarrow R-C=NOH$

The unsubstituted amidoxime-O-carbamate precursors (where $R_1 = R_2 = R_3 = H$) are conveniently prepared by reaction of the amidoximes of equation (c) in salt form, such as the hydrochloride salt, with an alkali metal cyanate as shown by equation (D) below:

(D) 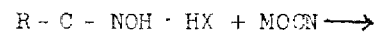
$R-C-NOH \cdot HX + MOCN \longrightarrow$

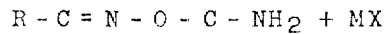
$R-C=N-O-C-NH_2 + MX$

The reaction of equation (D) is conducted in aqueous solution at a temperature between about 0° to 50°C. The reaction is generally complete in 15 minutes to 3 hours. Longer reaction times can be used but are not generally necessary.

The amidoxime-O-carbamate precursors wherein $R_1$ or $R_2$ is alkyl and $R_3$ is hydrogen are prepared by reacting amidoximes of equation (C) with an isocyanate according to equation (E) below:

(E) 
$R-C=NOH + R_1NCO \longrightarrow$

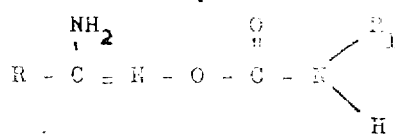

The reaction of equation (E) is readily effected by stirring the amidoxime of equation (C) in a suitable solvent such as dioxane, tetrahydrofuran, ethyl acetate, chloroform, diethylether, benzene, or the like while adding the isocyanate at a rate to maintain temperature from 0 to 50°C. The reaction is generally complete in about 5 hours; however, some reactions are vigorous enough to be completed in about ½ hour. The products are sufficiently stable under reaction conditions so that longer reaction times, e.g., up to 24 hours, do no harm, and for convenience, reaction periods lasting over night can be used.

The amidoxime-O-carbamate precursors wherein both $R_1$ and $R_2$ are alkyl and $R_3$ is hydrogen are prepared by reacting the amidoximes of equation (C) with a carbamoyl chloride according to equation (F) below:

(F) $R-C-NOH + R_1R_2NCOCl \xrightarrow{base}$

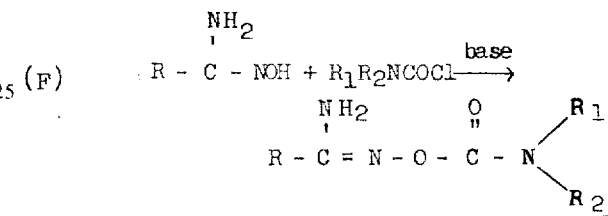

In equation (F), any carbamoyl halide can be used in place of carbamoyl chloride shown, for example, one can use carbamoyl chloride, bromide, or iodide. Nevertheless, for a balance of economy and convenience the carbamoyl chloride is generally preferred.

The use of a base is not essential but when used can be any convenient acid accepting compound that will combine with the acid by-product of the reaction. Thus, one can use alkali metal and alkaline earth metal oxides, hydroxides, carbonates and bicarbonates. Organic bases such as pyridine, quinoline, trialkylamines and the like are similarly useful.

The reaction of equation (F) is effected by adding the carbamoyl halide to the amidoxime in a suitable inert solvent such as dioxane, chloroform, diethylether, carbon tetrachloride or the like. The reaction is conducted at a temperature between room temperature, i.e., about 25°C, and the solvent reflux temperature for a period of time between about 15 minutes and 5 hours. Longer times are generally not required but do no harm.

The amidoxime-O-carbamate precursors where $R_3$ is alkyl of 1 through 6 carbon atoms is the subject of copending U.S. Pat. application Ser. No. 245,270, filed Apr. 18, 1972, now abandoned, by Rosetta McKinley Henderson. These amidoxime-O-carbamate precursors can be prepared by reaction of an appropriate hydroxamyl chloride with an amine to form the corresponding N-alkyl amidoxime which in turn is contacted with an isocyanate or a carbamoyl halide giving the desired carbamate. This sequence of reactions is illustrated in the following reaction (G) 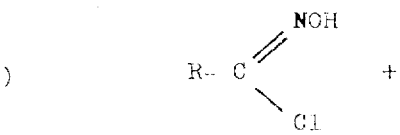

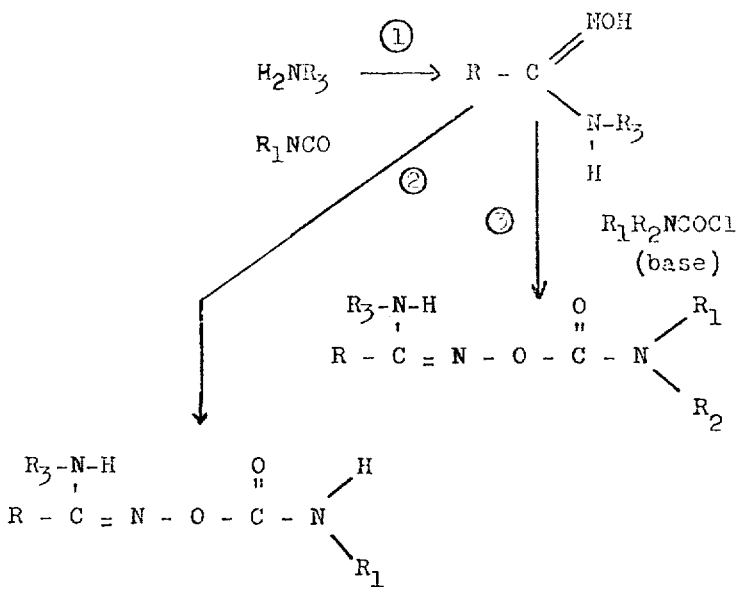

An alternate synthesis for the preparation of these N-mono substituted amidoximes is described by Takács and Harsángi (Ber. 103 2330–35 (1970).

All the amines, aldoximes, isocyanates and carbamoyl halides required in the preparation of these amidoxime-O-carbamate precursors are commercially available or can be prepared from readily available materials by methods well known in the art.

The starting hydroxamyl chlorides can be prepared by chlorination of an amidoxime, for example, as described by Piloty et al. (Ber. 35, 3101 (1902), and M. H. Benn (Can. Jr. Chem. 42, 293 (1964)).

The alkenyl hydroxamyl chlorides can be prepared by chlorination of the appropriate aldoxime in chloroform which has been chilled to about 0°C. according to the following reaction.

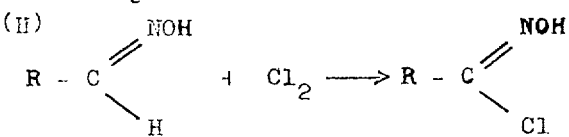

Reaction 1 in reaction scheme (G) above which produces an amidoxime is preferably conducted in an aprotic solvent at a temperature from about 0°C. to the reflux temperature of the solvent. Suitable solvents include benzene, chloroform, dimethyl sulfoxide, tetrahydrofuran, and diethyl ether. It is practical to have a proton acceptor present in stoichiometric amount in the reaction medium to neutralize hydrochloric acid which is liberated in this reaction. The proton acceptor may be, for example, any suitable tertiary amine such as pyridine, triethylamine, tributylamine, N,N-diethyl aniline and the like. Other suitable proton acceptors include basic anionic exchange resins, alkali metal carbonates, hydroxides, etc.

The following examples illustrates the preparation of the novel compounds of the present invention.

EXAMPLE 1

N-trifluoroacetylpentanamidoxime-O-(N-methylcarbamate)

To 10.0 grams of pentanamidoxime-O-(N-methylcarbamate) dissolved in 50 ml of dichloromethane was added 15.0 milliliters of trifluoroacetic anhydride. The reaction is slightly exothermic. After cooling to room temperature 0.1 gram of DABCO was added to catalyze further reaction and the mixture was stirred for one hour. The volatiles in the reaction mixture were then evaporated by using a jet of air.

To the remaining solid product was added enough water to suspend the product. The solid was filtered off and was repeatedly washed with water and air dried. The product was recrystallized twice from N-hexane, thus yielding 15.5 grams of N-trifluoroacetylpentanamidoxime-O-(N-methylcarbamate), m.p. 73.2°–73.8°C.

EXAMPLE 2

N-trifluoroacetylcycloheptanmethanamidoxime-O-(N-methylcarbamate)

To 0.5 gram of cycloheptanethanamidoxime-O-(N-methylcarbamate dissolved in 10 milliliters of dichloromethane were added 1 milliliter of catalyst, 0.1 gram per milliliter solution of DABCO in methylene chloride. To this mixture was added 5 milliliters of trifluoroacetic anhydride. The reaction mixture was heated to boiling and was then left to stand for 16 hours. The volatile components to the reaction mixture were removed by evaporation with a jet of air. The oily residue obtained crystallized with cooling and working. The solid was recrystallized from hexane, washed with water and dried, thus yielding 0.44 gram of N-trifluoroacetylcycloheptanmethanamidoxime-O-(N-methylcarbamate), m.p. 82.7°–83.3°C.

EXAMPLE 3

N-trifluorpacetylbutanamidoxime-O-carbamate

To 0.5 gram of butanamidoxime-O-carbamate dissolved with warming in 25 milliliters of dichloromethane were added 1 milliliter of catalyst, 0.1 gram per milliliter solution of DABCO in methylene chloride. To this mixture was added 5 milliliters of trifluoroacetic anhydride. The reaction mixture was heated to boiling and then was left standing 16 hours. The volatile components of the reaction mixture were removed by evaporation with a jet of air. The residue obtained was recrystallized from hexane, washed with water and air dried, thus yielding 0.64 grams of N-trifluoroacetylbutanamidoxime-O-carbamate, m.p. 131.7°–132.1°C.

EXAMPLE 4

N-trifluoroacetyl-3-methylbutanamidoxime-O-(N-methylcarbamate)

To 0.5 gram of 3-methylbutanamidoxime-O-(N-methylcarbamate) dissolved in 10 milliliters of dichloromethane were added 1 milliliter of catalyst, 0.1 gram per milliliter solution of DABCO in methylene chloride. To this mixture was added 5 milliliters of trifluoroacetic anhydride. The reaction mixture was heated to boiling and then was left standing 16 hours. The volatile components of the reaction mixture were removed by evaporation with a jet of air. The residue obtained was recrystallized from hexane, washed with water, and air dried, thus yielding 0.54 gram of N-trifluoroacetyl-3-methylbutanamidoxime-O-(N-methylcarbamate), m.p. 80.8°–81.7°C.

EXAMPLE 5

N-methyl-N-trifluoroacetylpentanamidoxime-O-[N-methylcarbamate]

N-methyl-n-pentanamidoxime-O-[N-methylcarbamate] (0.76 g., 4.1 mmole) and 1,4-diazabicyclo[2.2.2]octane (0.46 g., 4.1 mmole) were dissolved in 20 ml methylene chloride and the solution was cooled to −30°C. To this solution was added dropwise, with stirring, a solution of trifluoroacetic anhydride (41.3 g., 6.2 mmole) in approx. 0.5 ml. methylene chloride. The temperature was kept at <30°C. to −25°C. and a white solid formed. The reaction mixture was allowed to come slowly to room temperature. The solid was filtered off and the filtrate allowed to stand overnight at room temperature. More solid formed and was filtered off. The filtrate was evaporated on a rotary evaporator. The residue was taken up in ether, washed with water, aqueous sodium bicarbonate, again with water, then dried over magnesium sulfate. The ether was evaporated, leaving N-methyl-N-trifluoroacetyl-n-valeramidoxime O-[N-methylcarbamate].
Spectra:

19 F nmr (CDCl$_3$, CFCl$_3$), δ 68.9 ppm (S);
$^2$H nmr CDCl$_3$, TMS), δ 6.25 (1H), 3.25 (S,3H), 2.9 (d,3H,J=4.8H$_3$), 2.7 (m overlapping doublet, 2H), 1.5 (m, 4H), 1.0 (m,3H).

Using the appropriate precursor amidoxime-O-carbamate and trifluoroacetic anhydride, each of the following compounds can be prepared similarly.
Compounds illustrative of this invention are:
N-trifluoroacetylbutanamidoxime-O-(N,N-diemthylcarbamate)
N-trifluoroacetylbutanamidoxime-O-(N-ethylcarbamate)
N-trifluoroacetyl-2-methylpropanamidoxime-O-carbamate
N-trifluoroacetyl-2-butenamidoxime-O-(N-methylcarbamate)
N-trifluoroacetylpentanamidoxime-O-(N-methylcarbamate)
N-trifluoroacetylpentanamidoxime-O-(N,N-dimethylcarbamate)
N-trifluoroacetyl-2-methylbutanamidoxime-O-carbamate
N-trifluoroacetyl-3-methylbutanamidoxime-O-(N-propylcarbamate)
N-trifluoroacetyl-3-methyl-2-butenamidoxime-O-carbamate
N-trifluoroacetyl-2,2-dimethylpropanamidoxime-O-(N-methylcarbamate)
N-trifluoroacetylhexanamidoxime-O-(N-isopropylcarbamate)
N-trifluoroacetyl-2-methylpentanamidoxime-O-carbamate
N-trifluoroacetyl-3-methylpentanamidoxime-O-(N-methyl-N-ethylcarbamate)
N-trifluoroacetyl-4-methylpentanamidoxime-O-(N-ethylcarbamate)
N-trifluoroacetyl-4-methyl-1-pentanamidoxime-O-(N-methylcarbamate)
N-trifluoroacetyl-2,2-dimethylbutanamidoxime-O-carbamate
N-trifluorocetyl-3,3-dimethylbutanamidoxime-O-(N-ethylcarbamate)
N-trifluoroacetyl-3-hexenamidoxime-O-carbamate
N-trifluoroacetyl-4-hexenamidoxime-O-carbamate
N-trifluoroacetyl-5-hexenamidoxime-O-carbamate
N-trifluoroacetylheptanamidoxime-O-(N-propylcarbamate)
N-trifluoroacetyl-2-methylhexanamidoxime-O-(N-methylcarbamate)
N-trifluoroacetyl-3-methylhexanamidoxime-O-carbamate
N-trifluoroacetyl-4-methylhexanamidoxime-O-(N,N-diemthylcarbamate)
N-trifluoroacetyl-5-methylhexanamidoxime-O-carbamate
N-trifluoroacetyl-3-heptenamidoxime-O-carbamate
N-trifluoroacetyl-6-heptenamidoxime-O-(N-methylcarbamate)
N-trifluoroacetyl-2,2-dimethylpentanamidoxime-O-(N-ethylcarbamate)
N-trifluoroacetyl-2,3-dimethylpentanamidoxime-O-carbamate
N-trifluoroacetyl-2,4-dimethylpentanamidoxime-O-(N-propylcarbamate)
N-trifluoroacetyloctanamidoxime-O-carbamate
N-trifluoroacetyl-2-methylheptanamidoxime-O-(N-methylcarbamate)
N-trifluoroacetyl-2,2-dimethylhexanamidoxime-O-carbamate
N-trifluoroacetyl-2,3-dimethylhexanamidoxime-O-(N-ethylcarbamate
N-trifluoroacetyl-2,3,4-trimethylpentanamidoxime-O-carbamate
N-trifluoroacetyl-3-octenamidoxime-O-carbamate
N-trifluoroacetyl-7-octenamidoxime-O-(N,N-dimethylcarbamate)
N-trifluoroacetylnonanamidoxime-O-(N-methylcarbamate)
N-trifluoroacetylnonanamidoxime-O-(N,N-dimethylcarbamate)
N-trifluoroacetylnonanamidoxime-O-carbamate
N-trifluoroacetyldodecanamidoxime-O-(N-methylcarbamate)
N-trifluoroacetyl-2,4,4-trimethylpentanamidoxime-O-carbamate
N-trifluoroacetyl-2-methyloctanamidoxime-O-carbamate
N-trifluoroacetyl-7-methyloctanamidoxime-O-(N-isopropylcarbamate)
N-trifluoroacetyl-6,6-dimethylheptanamidoxime-O-carbamate
N-trifluoroacetyldecanamidoxime-O-carbamate N-trifluoroacetylcyclopropylmethanamidoxime-O-(N-methylcarbamate)
N-trifluoroacetylcyclobutylmethanamidoxime-O-carbamate
N-trifluoroacetylcyclopentylmethanamidoxime-O-(N-ethylcarbamate)
N-trifluoroacetyl-2-cyclopentenylmethanamidoxime-O-carbamate
N-trifluoroacetyl-3-methylcyclobutylmethanamidoxime-O-(N-isopropylcarbamate)
N-trifluoroacetylcyclohexylmethanamidoxime-O-carbamate
N-trifluoroacetyl-2-methylcyclopentylmethanamidoxime-O-(N-ethylcarbamate)
N-trifluoroacetyl-3-methylcyclopentylmethanamidoxime-O-carbamate
N-trifluoroacetyl-2,3-dimethylcyclobutylmethanamidoxime-O-carbamate
N-trifluoroacetyl-3-cyclohexenylmethanamidoxime-O-(N-methylcarbamate)
N-trifluoroacetyl-2-methyl-3-cyclopentenylmethanamidoxime-O-carbamate
N-trifluoroacetylcycloheptylmethanamidoxime-O-(N,N-dimethylcarbamate)
N-trifluoroacetyl-2-methylcyclohexylmethanamidoxime-O-carbamate
N-trifluoroacetyl-3-methylcyclohexylmethanamidoxime-O-carbamate
N-trifluoroacetylcyclooctylmethanamidoxime-O-(N-methylcarbamate)
N-trifluoroacetyl-1-norbornylmethanamidoxime-O-carbamate
N-trifluoroacetyl-2-norbornylmethanamidoxime-O-(N-methylcarbamate)
N-trifluoroacetyl-2-norbornenyl-5-exo-methanamidoxime-O-carbamate
N-trifluoroacetyl-2-bicyclo[2.2.2]octylmethanamidoxime-O-carbamate
N-trifluoroacetyl-2-bicyclo[2.2.2]octenyl-5-methanamidoxime-O-(N-ethyl-carbamate)
N-trifluoroacetyl-1-bicyclo[2.2.2]octylmethanamidoxime-O-carbamate
N-trifluoroacetyl-1-bicyclo[3,2,2]nonylmethanamidoxime-O-carbamate
N-trifluoroacetyl-4,7-methanoindyl-5-exo-methanamidoxime-O-(N-methyl-carbamate)
N-trifluoroacetyl-4,7-methanoindyl-3a-methanamidoxime-O-carbamate
N-trifluoroacetyl-4,7-methanoindyl-5-endo-methanamidoxime-O-(N-isopropylcarbamate)
N-trifluoroacetyl-1-adamantylmethanamidoxime-O-carbamate
N-trifluoroacetyl-2-adamantylmethanamidoxime-O-(N-methylcarbamate)
N-trifluoroacetyl-4-methyl-1-bicyclo[2,2,2]octylmethanami-doxime-O-carbamate)
N-trifluoroacetyl-1-decahydronaphthylmethanamidoxime-O-carbamate
N-trifluoroacetyl-2-decahydronaphthylmethanamidoxime-O-(N-methylcarbamate)
N-trifluoroacetyl-4-cyclohexyl-1-cyclohexylmethanamidoxime-O-carbamate
N-trifluoroacetyl-6-cyclohexyl-1-hexylmethanamidoxime-O-(N-ethylcarbamate)

N-trifluoroacetyl-1-cyclohexeneacetamidoxime-O-(N-methylcarbamate)
N-trifluoroacetyl-1-tricyclo[4.3.1.1$^{3,8}$]undecylmethanamidoxime-O-carbamate)
N-trifluoroacetyl-6-tricyclo[3.2.2.0$^{2,}$, 4]nonylmethanamidoxime-O-(N-methylcarbamate)
N-ethyl-N-trifluoroacetylpropanamidoxime-O-(N-methylcarbamate)
N-ethyl-N-trifluoroacetylpentanamidoxime-O-(N-ethylcarbamate)
N-ethyl-N-trifluoroacetylheptanamidoxime-O-(N-methyl-N-ethylcarbamate)
N-propyl-N-trifluoroacetylbutenamidoxime-O-(N-methylcarbamate)
N-propyl-N-trifluoroacetylhexanamidoxime-O-(N,N-dimethylcarbamate)
N-propyl-N-trifluoroacetyloctanamidoxime-O-(N-propylcarbamate)
N-butyl-N-trifluoroacetylbutanamidoxime-O-carbamate
N-butyl-N-trifluoroacetylnonanamidoxime-O-(N-ethylcarbamate)
N-butyl-N-trifluoroacetyldodecanamidoxime-O-(N-methyl-N-ethylcarbamate)
N-isobutyl-N-trifluoroacetylpropanamidoxime-O-(N-methylcarbamate)
N-sec-butyl-N-trifluoroacetylbutanamidoxime-O-carbamate
N-pentyl-N-trifluoroacetylpentanamidoxime-O-(N-methylcarbamate)
N-isopentyl-N-trifluoroacetylheptanamidoxime-O-(N-ethylcarbamate)
N-hexyl-N-trifluoroacetylbutanamidoxime-O-(N,N-dimethylcarbamate)

Formulation and Use

The compounds of this invention can be administered in the treatment of hypertension according to the invention by any means that effects contact of the active ingredient compound with the site of action in the body of a warm-blooded animal. For example, administration can be parenterally, i.e., subcutaneously, intraveneously, intramuscularly, or intraperitoneally. Alternatively or concurrently, administration can be by the oral route.

The dosage administered will be dependent upon the age, health and weight of the recipient, the extent of disease, kind of concurrent treatment, if any, frequency of treatment and the nature of the effect desired. Generally, a daily dosage of active ingredient compound will be from about 0.01 to 50 milligrams per kilogram of body weight. Ordinarily, from 0.05 to 40, and preferably 0.1 to 20 milligrams per kilogram per day, in one or more applications per day is effective to obtain the desired results. For the more potent compounds of the invention, e.g., N-trifluoroacetylpentanamidoxime-O-(N-methylcarbamate and N-methyl-N-trifluoroacetylpentanamidoxime-O-(N-methylcarbamate), the daily dosage ranges are from about 0.01 to about 20 milligrams per kilogram, preferably 0.05 to 10 milligrams per kilogram and more preferably 0.1 to 5 milligrams per kilogram.

The antihypertensive activity of the compounds of the present invention is evidenced by tests which show a blood pressure lowering action in hypertensive rats. In a test involving rats made hypertensive by repeated injections of desoxycorticosterone acetate (DOCA) according to the method described by Stanton and White

[Arch. Intern. Pharmacodyn., 154, 351 (1965)], N-trifluoroacetylpentanamidoxime-O-(N-methylcarbamate) is injected intrapertionally and orally into separate groups of eight test animals at each of five dose levels separated by a three fold increment. The compound is prepared in an aqueous polyvinyl alcohol acacia vehicle and administered at a volume to body weight ratio of 5.0 milliliters per kilogram.

Each rat's systolic arterial blood pressure is determined at 1, 2, 4 and 6 hours after the dose is administered by a modification of the microphone-monometer technique (Friedman M. and Freed S.C., Proc. Soc, Exp. Biol. and Med., 70, 670 (1949)).

It was determined as a result of these tests that 2 milligrams per kilogram of the compound (orally and intraperitoneally) produces a 30 mm mercury (mm Hg) reduction in blood pressure compared with that of a group of 16 concurrently tested control animals dosed only with the polyvinyl alcohol vehicle. At 30 mm Hg reduction in pressure is statistically significant at the 0.05 level or beyond by 2-tailed "t" test and represents a 50% return to a normal blood pressure level for the rat.

The compounds of this invention can be employed in useful pharmaceutical compositions according to the present invention in such dosage forms as tablets, capsules, powder packets, or liquid solutions, suspensions or elixirs for oral administration or liquid for parenteral use (except intravenous injections). In such compositions, the active ingredient ordinarily will be present in an amount of at least 0.5% by weight based on the total weight of the composition and not more than 95% by weight.

Besides the active ingredient compound of this invention, the antihypertensive composition will contain a solid or liquid nontoxic pharmaceutical carrier for the active ingredient.

In one embodiment of a pharmaceutical composition of this invention, the solid carrier is a capsule which can be of the ordinary gelatin type. In the capsules will be from about 5 to 90% by weight of a compound of the invention and 95 to 10% of a carrier. In another embodiment the active ingredient is tableted with or without adjuvants. In another embodiment the active ingredient is put into powder packets and employed. These capsules, tablets and powders will generally constitute from about 1% to about 95%, and preferably from 5 to 90% by weight of active ingredient. These dosage forms preferably contain from about 5 to about 500 milligrams of active ingredient with about 7 to about 250 most preferred.

The pharmaceutical carrier can be a sterile liquid such as water and oil, including those of petroleum, animal, vegetable oils of synthetic origin, for example, peanut oil, soybean oil, mineral oil, sesame oil, and the like. In general, water saline, aqueous dextrose (glucose) and related sugar solutions and glycols such as propylene glycol or polyethylene glycols are preferred liquid carriers, particularly for injectable solutions. Sterile injectable solutions such as saline will ordinarily contain from about 0.5 to 25% and preferably about 1 to 10% by weight of the active ingredient.

As mentioned above, oral adminstration can be in a suitable suspension or syrup, in which the active ingredient ordinarily will constitute from about 0.7 to 10% and preferably 1 to 5% by weight. The pharmaceutical carrier in such a composition can be a watery vehicle such as an aromatic water, a syrup or a pharmaceutical muscilage.

Suitable pharmaceutical carriers are described in "Remington's Pharmaceutical Sciences" by E. W. Martin, a well known reference text in this field. The following examples will further illustrate the preparation of pharmaceutical compositions of the invention.

EXAMPLE 6

A large number unit capsules are prepared by filling standard two-piece hard gelatin capsules each with 250 milligrams of powdered N-trifluoroacetylpentanamidoxime-O-(N-methyl),110 milligrams of lactose, 32 milligrams of talc and 8 milligrams of magnesium stearate.

EXAMPLE 7

A mixture of N-trifluoroacetylcycloheptanmethanamidoxime-O-(N-methylcarbamate) in soybean oil is prepared and injected by means of positive displacement pump into gelatin to form soft gelatin capsules containing 35 milligrams of the active ingredient. Capsules are washed in petroleum ether and dried.

EXAMPLE 8

A large number of tablets are prepared by conventional procedures so that the dosage unit is 100 milligrams of active ingredient, 0.2 milligrams of colloidal silicon dioxide, 3 milligrams of magnesium stearate, 50 milligrams of microcrystalline cellulose, and 100 milligrams of anhydrous lactose. Appropriate coatings may be applied to increase palatability or delay absorption.

EXAMPLE 9

A parenteral composition suitable for adminstration by injection is prepared by stirring 1.5% by weight of N-trifluoroacetylbutanamidoxime-O-carbamate in 10% by volume propylene glycol and water. The solution is sterilized as by filtration.

EXAMPLE 10

An aqueous suspension is prepared for oral administration so that each 5 milliliters contain 50 milligrams of finely divided N-trifluoroacetyl-3-methylbutanamidoxime-O-(N-methylcarbamate), 500 milligrams of acacia, 5 milligrams of sodium benzoate, 1.0 gram of sorbitol solution, U.S.P., 5 milligrams of sodium saccharin and 0.025 milliliters of vanilla tincture.

EXAMPLE 11

A parenteral composition suitable for administration by injection is prepared by dissolving 1% by weight of N-trifluoroacetylbutanamidoxime-O-(N,N-dimethylcarbamate) in sodium chloride injection U.S.P. XV and adjusting the pH of the solution to between 6 and 7. The solution is sterilized by filtration.

The corresponding N-alkyl compounds (i.e., compounds of formula I where $R_3$ is alkyl of 1 through 6 carbon atoms) can be formulated in the same manner as those exemplified by Examples 6–11.

A wide variety of composition coming within this invention can be prepared by substituting other compounds of this invention, including specifically but not limited to those compounds named hereinbefore, for the compounds named in Examples 5 through 10 above and substituting other suitable pharmaceutical carriers

I claim:

1. Compounds of the formula

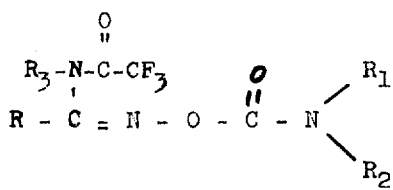

where

R is an aliphatic hydrocarbon of from 3 through 12 carbon atoms, $R_1$ and $R_2$ are each independently hydrogen or lower alkyl of from 1 through 3 carbon atoms, provided, however, that the sum of carbon atoms in $R_1$ and $R_2$ does not exceed 3, $R_3$ is hydrogen or alkyl of from 1 through 6 carbon atoms, and pharmaceutically acceptable salts of these compounds.

2. Compounds of claim 1 where $R_1$ and $R_2$ are each independently hydrogen or methyl and $R_3$ is hydrogen.

3. A compound of claim 1 which is N-trifluoroacetylpentanamidoxime-O-(N-methylcarbamate).

4. A compounds of claim 1 which is N-trifluoroacetylcycloheptanmethaneamidoxime-O-(N-methylcarbamate).

5. A compound of claim 1 which is N-trifuoroacetylbutanamidoxime-O-carbamate.

6. A compound of claim 1 which is N-trifluoroacetyl-3-methylbutanamidoxime-O-(N-methylcarbamate).

7. A compound of claim 1 which is N-methyl-N-trifluoroacetylpentanamidoxime-O-(N-methylcarbamate).

* * * * *